United States Patent
Winistoerfer et al.

(10) Patent No.: US 8,534,640 B2
(45) Date of Patent: Sep. 17, 2013

(54) VALVE SWITCH UNIT

(75) Inventors: Martin Winistoerfer, Hinterforst (CH); Gregory D. Chiocco, Sunnyvale, CA (US)

(73) Assignee: Topcon Positioning Systems, Inc., Livermore, CA (US)

( * ) Notice: Subject to any disclaimer, the term of this patent is extended or adjusted under 35 U.S.C. 154(b) by 999 days.

(21) Appl. No.: 12/180,765

(22) Filed: Jul. 28, 2008

(65) Prior Publication Data

US 2009/0038185 A1    Feb. 12, 2009

Related U.S. Application Data (60) Provisional application No. 60/963,269, filed on Aug. 3, 2007.

(51) Int. Cl.
*F16K 31/05*    (2006.01)
*F16K 31/46*    (2006.01)

(52) U.S. Cl.
USPC ................. 251/129.04; 251/129.03

(58) Field of Classification Search
USPC ........... 251/129.04, 129.03, 129.15; 361/160
See application file for complete search history.

(56) References Cited

U.S. PATENT DOCUMENTS

| | | | |
|---|---|---|---|
| 3,386,689 A * | 6/1968 | Parker et al. | 244/189 |
| 6,067,782 A | 5/2000 | Diekhans | |
| 6,979,504 B2 * | 12/2005 | Manery | 429/432 |
| 7,946,504 B2 * | 5/2011 | Shapira et al. | 236/12.12 |

OTHER PUBLICATIONS

Japanese Office Action dated Oct. 11, 2012, corresponding to Japanese Application No. 2010-519916, filed Jul. 30, 2008 (3 pages).

* cited by examiner

*Primary Examiner* — John K Fristoe, Jr.
*Assistant Examiner* — Jonathan Waddy
(74) *Attorney, Agent, or Firm* — Wolff & Samson, PC (57) ABSTRACT

A valve switch unit has a detector configured to detect an input, such as current, from a machine controller. The valve switch unit also has a switching circuit configured to switch control of the one or more valves an automatic controller to the machine controller if the input from the machine controller exceeds a predetermined threshold. When the current detected exceeds the predetermined threshold, the circuit switches control from the automatic controller to the machine controller. In a similar fashion, when the current falls below the predetermined threshold, the circuit switches control back to the automatic controller.

10 Claims, 6 Drawing Sheets

VALVE SWITCH UNIT

This application claims the benefit of U.S. Provisional Application No. 60/963,269 filed on Aug. 3, 2007, which is incorporated herein by reference.

BACKGROUND OF THE INVENTION

The present invention is related generally to valve control, and in particular, to valve switching in automatically guided construction equipment.

In construction (e.g., road paving, grading, etc.), conventional systems make ready use of automatic control of certain components of the construction equipment. For example, automatic control may be exerted over valves that actuate certain components on a construction vehicle, such as a grader. Where automatic control is used, systems employ a manual override to allow an operator to control the valves (e.g., raise and/or lower a combine, etc.) in the presence of an obstacle or in other situations that the automatic controller is not configured to handle.

Figure 1:
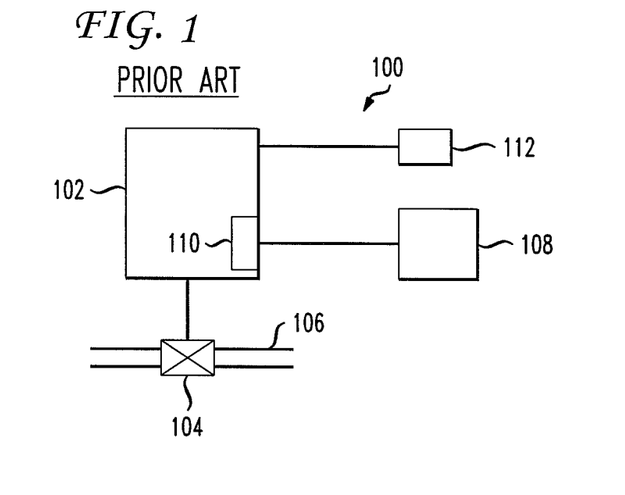
FIG. 1 depicts a conventional valve control system.
Figure 2:
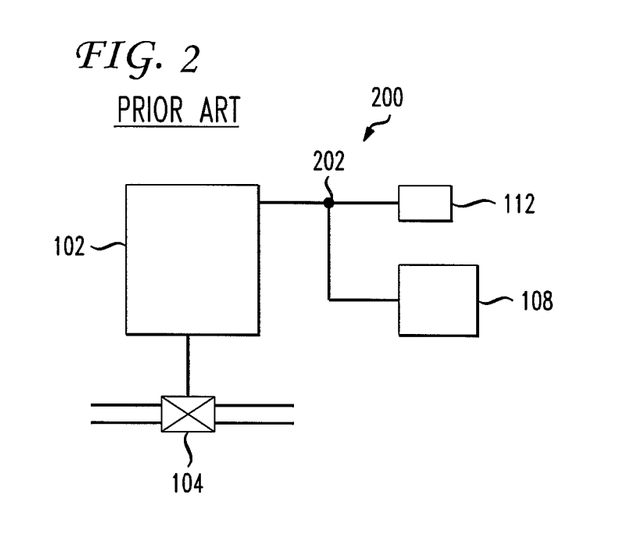
FIG. 2 depicts a conventional valve control system.
Figure 3:
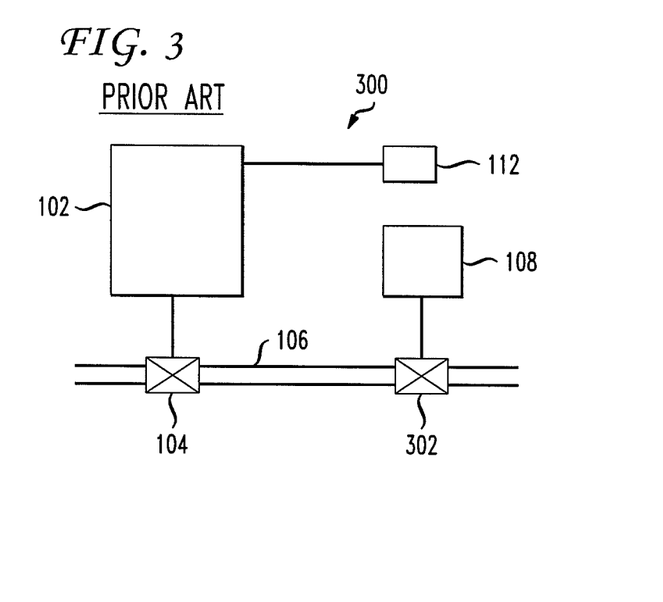
FIG. 3 depicts a conventional valve control system.

Currently, there are three basic configurations in use for valve control in automated construction equipment. These conventional configurations are depicted in FIGS. 1-3. The arrangement of such systems are well known, so are only described with sufficient detail to highlight the shortcomings of such systems remedied by the present invention. For simplicity of presentation, where analogous components and/or systems are presented in the various prior art configurations of FIGS. 1-3, the analogous components and/or systems are referred to with the same reference numeral—even if not completely identical.

FIG. 1 depicts a conventional valve control system 100. In the prior configuration of FIG. 1, a machine controller 102 drives a valve 104 (e.g., through a valve solenoid, valve controller, etc., not shown) of a hydraulic system 106. Hydraulic system 106 may be a hydraulic system in a construction vehicle as described above and valve 104 may control raising and/or lowering of one or more combines, etc. In automatic operation, machine controller 102 receives automatic control signals from automatic controller 108 via a communication device 110. Communication device 110 is generally a bus, such as a Controller Area Network (CAN) serial bus that utilizes a host controller (not shown) to transmit control signals from the automatic controller to the machine controller. Separately, the machine controller receives control signals (e.g., a current) from a manual controller 112. These control signals are indicative of an operator input at a manual steering command (e.g., steering wheel, steering console, joystick, etc.). When the machine controller 102 receives such control signals from the manual controller 112, the machine controller 102 overrides any control from the automatic controller 108. While conventional valve control system 100 is relatively simple, it is dependent on the performance of machine controller 102. Since the automatic controller 108 and manual controller 112 are connected serially through the machine controller 102 to the valve 104, an automatic control signal may be delayed, leading to deleterious performance.

FIG. 2 depicts a conventional valve control system 200. In the prior configuration of FIG. 2, the automatic controller 108 manipulates control signals from the manual controller 112 at an interface point 202. As in the conventional valve control system 100, since the control signals from the manual controller 112 and the automatic controller 108 (via the interface point 202) are passed serially through the machine controller 102, an automatic control signal may be delayed. Additionally, in such a configuration, there may be issues with steering interference. For example, since steering control signals are passed between the electrical connection of machine controller 102 and manual controller 112, interface point 202 must be physically spliced into this connection, which leads to steering control interference.

FIG. 3 depicts a conventional valve control system 300. In the prior configuration of FIG. 3, an automatic control valve 302 is inserted into hydraulic system 106 in addition to valve 104. The automatic controller 108 drives the automatic control valve 302 while the machine controller 102 drives the valve 104 with manual control input from the manual controller 112. While such a system provides a smooth manual override because the automatic controller 108 and the machine controller 102 are in parallel, conventional valve control system 300 is time consuming and expensive to install and is more prone to failure due to the use of an additional valve.

Therefore, there remains a need to provide an inexpensive way to seamlessly switch between machine control and automatic control with high dynamic response in construction equipment.

BRIEF SUMMARY OF THE INVENTION

The present invention is generally directed to an apparatus for switching control of one or more valves between a machine controller and an automatic controller. The apparatus is a valve switch unit (VSU) that has a sensor configured to detect an input from the machine controller. The valve switch unit also has a switching circuit configured to switch control of the one or more valves from the automatic controller to the machine controller if the input from the machine controller exceeds a predetermined threshold.

In some embodiments, the switching circuit of the valve switch unit includes a current detector (e.g., the sensor configured to detect an input from the machine controller) to detect current from the machine controller. When the current detected exceeds the predetermined threshold, the circuit switches control from the automatic controller to the machine controller. In a similar fashion, when the current falls below the predetermined threshold, the circuit switches control back to the automatic controller.

These and other advantages of the invention will be apparent to those of ordinary skill in the art by reference to the following detailed description and the accompanying drawings.

DETAILED DESCRIPTION

The present invention is related generally to valve control, and in particular to switching valve control in automatically guided construction equipment. In general, an automatic controller is used in parallel with a machine controller to drive a valve solenoid through a valve switch unit. This avoids control delays and negates a need to address machine controller interface requirements (e.g., machine protocols, signal levels, etc.). The arrangement is also generally faster and cheaper to install than conventional solutions.

Figure 4:
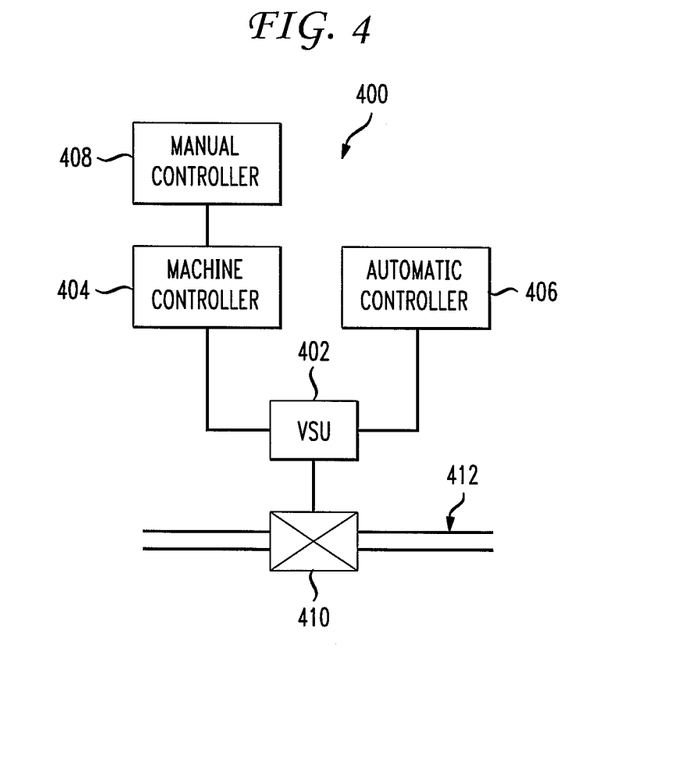
FIG. 4 depicts a simplified block diagram of a valve control system according to an embodiment of the invention.

FIG. 4 depicts a simplified block diagram of a valve control system 400 according to an embodiment of the invention. Valve control system 400 may be used in conjunction with and/or incorporated into control systems of construction equipment, agriculture equipment, etc.

Valve control system 400 includes a valve switch unit (VSU) 402. Valve switch unit 402 may be coupled to (e.g., electrically, logically, via an interface, etc.) and may receive signals from a plurality of input devices. In at least one embodiment, the input devices are a machine controller 404 and/or an automatic controller 406. In the same or alternative embodiments, machine controller 404 may be coupled to (e.g., electrically, logically, via an interface, etc.) and may receive signals from a manual controller 408.

Valve switch unit 402 may include one or more electrical circuit components as will be described in further detail below with respect to FIGS. 5, 6, and 7. Accordingly, valve switch unit 402 may be capable of receiving signals such as control signals, current, etc. from machine controller 404, automatic controller 406 and/or, in some embodiments, directly from manual controller 408. Valve switch unit 402 may then be coupled to and capable of interpreting, transmitting, and/or forwarding control signals indicative of and/or based on the received control signals to a valve 410 in a hydraulic system 412. Though depicted in FIG. 4 as a single valve 410, valve switch unit may be coupled to and control more than one valve 410.

Valve switch unit 402 may be further adapted to select between the received control signals (e.g., by use of one or more electrical and/or electromechanical switches, relays, etc. as described below with respect to FIGS. 5, 6, and 7) and pass corresponding control signals (e.g., valve control signals, current, etc.) to valve 410. That is, valve switch 402 may switch control of valve 410 from automatic controller 406 to machine controller 404 and/or switch control of valve 410 from machine controller 404 to automatic controller 406. Further operation of valve switch unit 402 is discussed below with respect to method 800 of FIG. 8. Exemplary valve switch units are discussed in further detail below with respect to FIGS. 5 and 6.

Machine controller 404 is any controller capable of receiving control input from manual controller 408 and driving one or more valves, as is known. In practical operation, machine controller 404 may be a controller utilized in manual driving and/or steering control of a vehicle (e.g., a construction vehicle) and/or machine part positioning (e.g., positioning of a blade in a grader, etc.). Manual controller 408 may be any machine control input device such as a steering wheel, steering console, joystick, etc. that allows an operator to provide manual control input to a machine (e.g., construction equipment, vehicle, etc.) for machine part positioning and/or steering control.

Automatic controller 406 is a controller configured to generate automatic control signals based on positioning information (e.g., GPS, GLONASS, etc.) as is known. That is, systems that employ valve control system 400, such as automatically guided construction equipment, may be guided by automatic control signals based on received positioning information from a satellite positioning receiver or the like.

In one or more embodiments, valve 410 may be a solenoid valve or may be operated similarly to a solenoid valve. That is, valve 410 may be an electromechanical valve in hydraulic system 412 that is controlled by receiving or not receiving electrical current at a solenoid. When current is received (e.g., detected) at the solenoid above a certain threshold, the valve 410 is set to one state (e.g., open). When no current or a current below a threshold is received, the valve 410 is set to another state (e.g., closed). In this way, the valve 410 is controlled by receipt or non-receipt of current (e.g., control signals).

As shown in FIG. 4, machine controller 404 and automatic controller 406 may be arranged in parallel. That is, valve switch unit 402 may receive signals directly and/or substantially simultaneously from machine controller 404 and automatic controller 406. In this way, valve switch unit 402 may receive, process, and/or act upon control signals from machine controller 404 and automatic controller 406 more readily than in prior arrangements. For example, with machine controller 404 and automatic controller 406 connected in parallel to valve switch unit 402, valve switch unit 402 may facilitate contact (e.g., control, current flow, etc.) between machine controller 404 and valve 410 and may quickly "switch" to cut off contact between machine controller 404 and valve 410 and establish contact between automatic controller 406 and valve 410. Valve switch unit 402 may similarly "switch" to cut off contact between automatic controller 406 and valve 410 and establish contact between machine controller 404 and valve 410. In such an arrangement, priority of control over valve 410 is generally given to machine controller 404. In some embodiments, manual controller 408 may be connected directly to valve switch unit 402 and is thus in parallel with automatic controller 406 in the same way. When coupled in such a manner, valve switch unit may "switch" between manual controller 408 and automatic controller 406 in a similar fashion.

Figure 5:
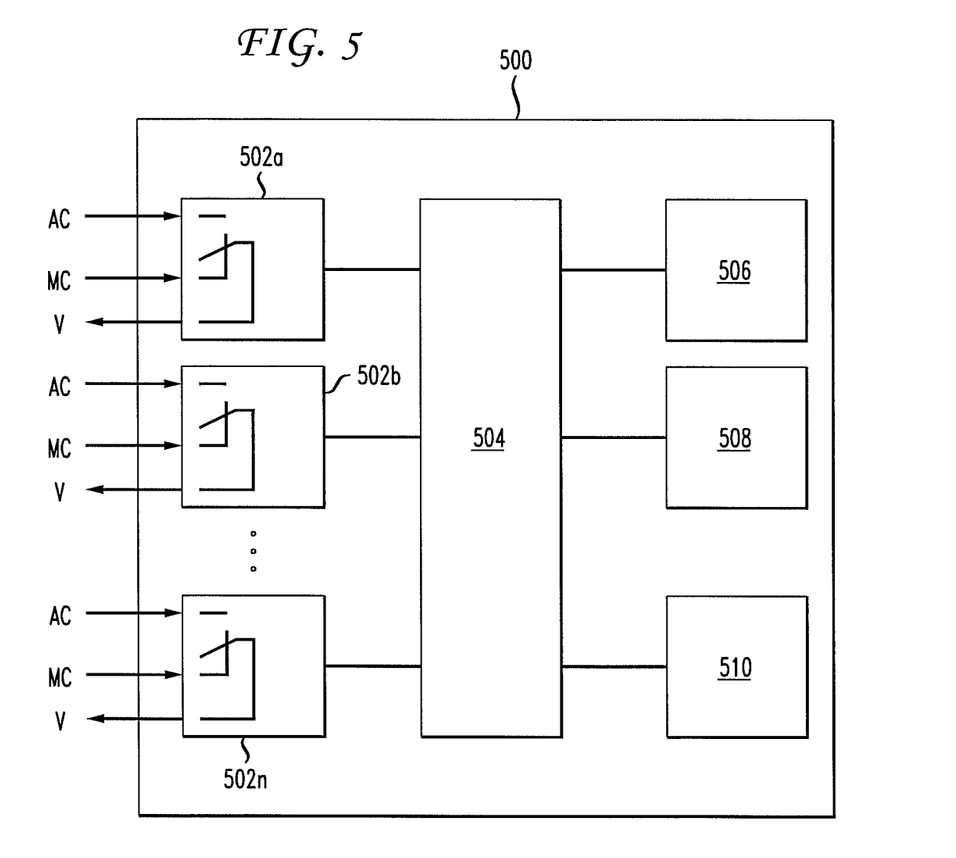
FIG. 5 is a simplified block diagram of a valve switch unit according to an embodiment of the invention.

FIG. 5 is a simplified block diagram of a valve switch unit 500 according to an embodiment of the invention. Valve switch unit 500 may be similar to valve switch unit 402 and may be used in valve control system 400. Valve switch unit 500 may be implemented as an electrical or electromechanical device and may accordingly be and/or include one or more integrated circuits, relays, switches, etc.

Valve switch unit 500 may control multiple valves (e.g., valve 410 of FIG. 4). Valves may be controlled by (e.g., receive control signals from) multiple channels 502a, 502b, through 502n. Each channel 502a-502n may receive control signals from an automatic controller (AC in FIG. 5) (e.g., automatic controller 406 of FIG. 4 above) and a machine controller (MC in FIG. 5) (e.g., machine controller 404 of FIG. 4 above) and may output control signals to one or more valves (V in FIG. 5) (e.g., valve 410 of FIG. 4 above). In this way, valve switch unit 500 may have multiple inputs and multiple outputs from and to a variety of devices.

Channels 502a-502n may be coupled to a microprocessor 504. Microprocessor 504 may, in turn, be coupled to one or more power supplies 506, one or more over-voltage and/or over-current protectors 508, and one or more communication devices 510. These electrical components are well known and will not be discussed in further detail herein except as they relate to the present invention. Of course, alternative arrangements may be implemented. In some embodiments, over-voltage and/or over-current protectors 508 may be incorporated into and/or coupled directly to each of channels 502a-502n. In the same or alternative embodiments, channels 502a-502n may connect to valves through communication devices 510.

Channels 502a-502n may be and/or include electrical or electromechanical components configured to switch control of valves between an automatic controller and a machine controller. One embodiment of such channels is described below with respect to FIG. 7. Each channel 502a-502n may be completely transparent to controllers (e.g., automatic controller 406 and/or machine controller 404 of FIG. 4). This may prevent inadvertent error condition signals. For example, if valve switch unit 402 produced a leakage current, machine controller 404 may incorrectly trigger a disconnected valve and enter into an error mode.

Microprocessor 504 may be any appropriate electronic component, such as a programmable digital electronic component, a microcontroller, an integrated circuit, or the like.

In some embodiments, power supply 506 may be an energy supply unit (e.g., a power supply unit) for valve switch unit 500 as is known. In an alternative embodiment, power supply 506 may be an interface or connection to an external power supply, such as a power supply of a valve control system 400 and/or of a construction vehicle, etc.

Over-voltage and/or over-current protectors 508 may incorporate any appropriate over-voltage protection devices and/or over-current protection devices such as active over-voltage/current circuits, zener diodes, avalanche diodes, Transils, circuit breakers, or the like.

Communication devices 510 may be any appropriate devices for communication. In some embodiments, communications devices 510 may be serial communication devices such as RS485 serial buses, Controller Area Network (CAN) buses, etc.

Figure 6:
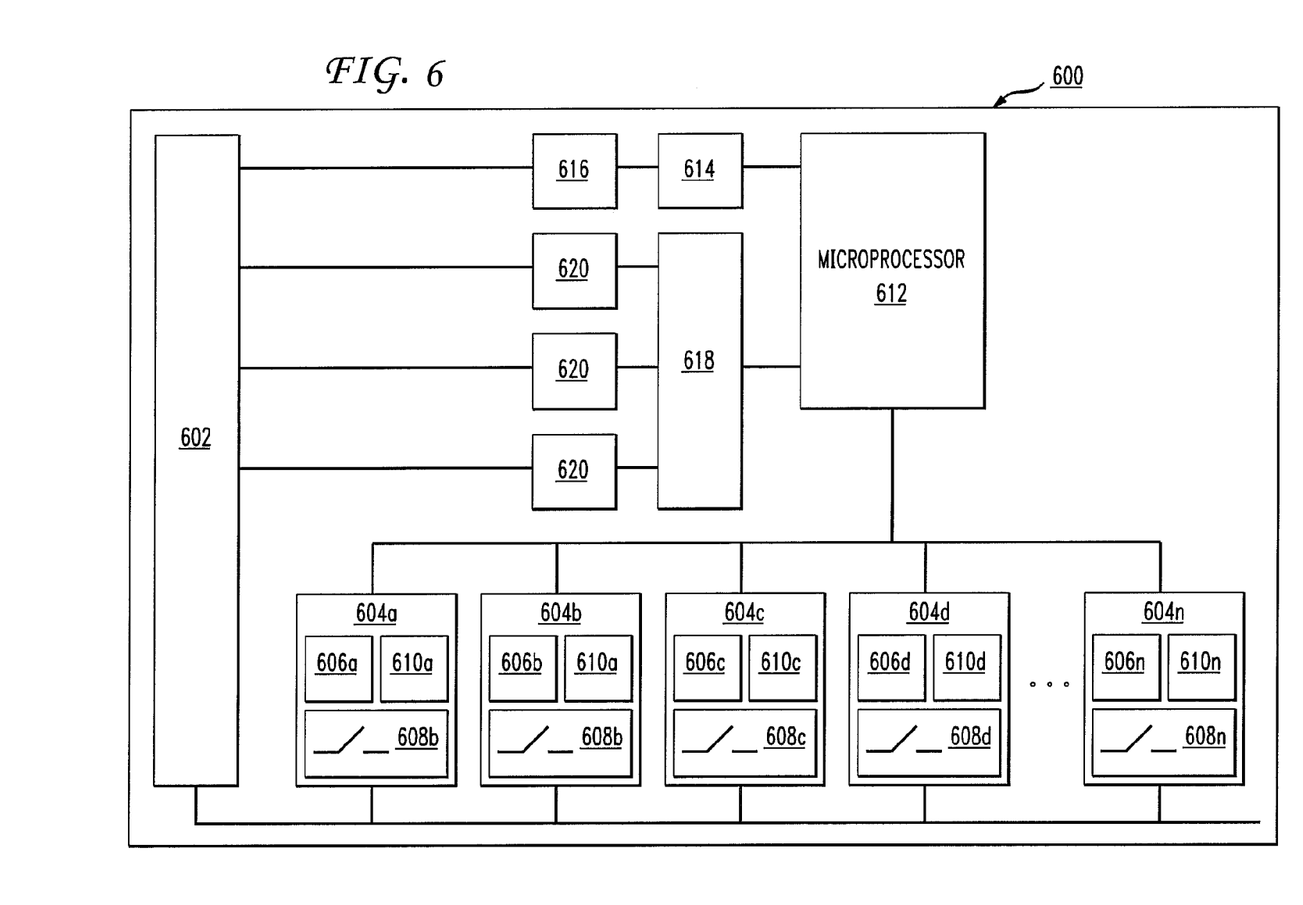
FIG. 6 depicts a representative block diagram of a valve switch unit according to another embodiment of the invention.

FIG. 6 depicts a representative block diagram of a valve switch unit 600 according to another embodiment of the invention. Valve switch unit 600 may be similar to valve switch unit 500 and/or valve switch unit 402 and may be used in valve control system 400. Like valve switch unit 500, valve switch unit 600 may be implemented as an electrical or electromechanical device and may accordingly be and/or include one or more integrated circuits, relays, switches, etc. Accordingly, the particularities of analogous components in valve switch unit 600 are not discussed in further detail as their implementation is described generally above with respect to valve switch unit 500.

Valve switch unit 600 may be coupled to, receive signals from, transmit signals to, and control multiple valves (e.g., valve 410 of FIG. 4) through communications bus 602. Valves switch unit 600 may also include multiple channels 604a, 604b, 604c, 604d, through 604n, similar to channels 502a-502n of valve switch unit 500 above, communicative with the valves through communications bus 602. Each channel 604a-604n may also receive control signals from an automatic controller (e.g., automatic controller 406 of FIG. 4 above) and a machine controller (e.g., machine controller 404 of FIG. 4 above) through communications bus 602. In some embodiments, each channel 604a-604n may also receive control signals from a manual controller (e.g., manual controller 408 of FIG. 4 above). In other words, valve switch unit 600 may have multiple inputs and multiple outputs from and to a variety of devices through communications bus 602.

Channels 604a-604n may each include a current sensor 606a-606n and a switch (e.g., a switching circuit) 608a-608n. In some embodiments, current sensors 606a-606n may be incorporated into switches (e.g., switching circuits) 608a-608n. Such an arrangement is shown below with respect to channel 700 of FIG. 7. In the same or alternative embodiments, each channel 604a-604n may also include over-voltage and/or over-voltage protectors 610a-610n.

Channels 604a-604n may be coupled to a microprocessor 612. Microprocessor 612 may, in turn, be coupled to a power supply 614 which is provided over-voltage protection by over-voltage protector 616 coupled to communications bus 602. Microprocessor 612 may also be coupled to an isolator switch 618 coupled serially through one or more communications devices 620 to communications bus 602.

Communications bus 602 may be an electrical bus or connector (e.g., a multi-pin connector) as is known. Accordingly, communications, control signals, power, current, etc. may be passed between components coupled directly and/or indirectly to the communications bus 602. In at least one embodiment, communications bus 602 is a 40-pin I/O connector.

Current sensors 606a-606n may be any device or combination of devices configured to detect an electrical current (e.g., from a valve, automatic controller, machine controller, etc.) and generate a proportional signal to be used by the switches 608a-608n, microprocessor 612, or any other device associated with valve switch unit 600.

Switches 608a-608n may be any switch, gate, or similar device or combination of devices used to alter the flow of signals (e.g., communications signals, current, etc.) in channels 604a-604n and/or elsewhere in valve switch unit 600. In this way, switches 608a-608n may be used to switch control of valves from automatic controllers to machine controllers and vice versa. That is, switches 608a-608n may facilitate direction of current through channels 604a-604n specifically and valve switch unit 600 generally.

Figure 7:
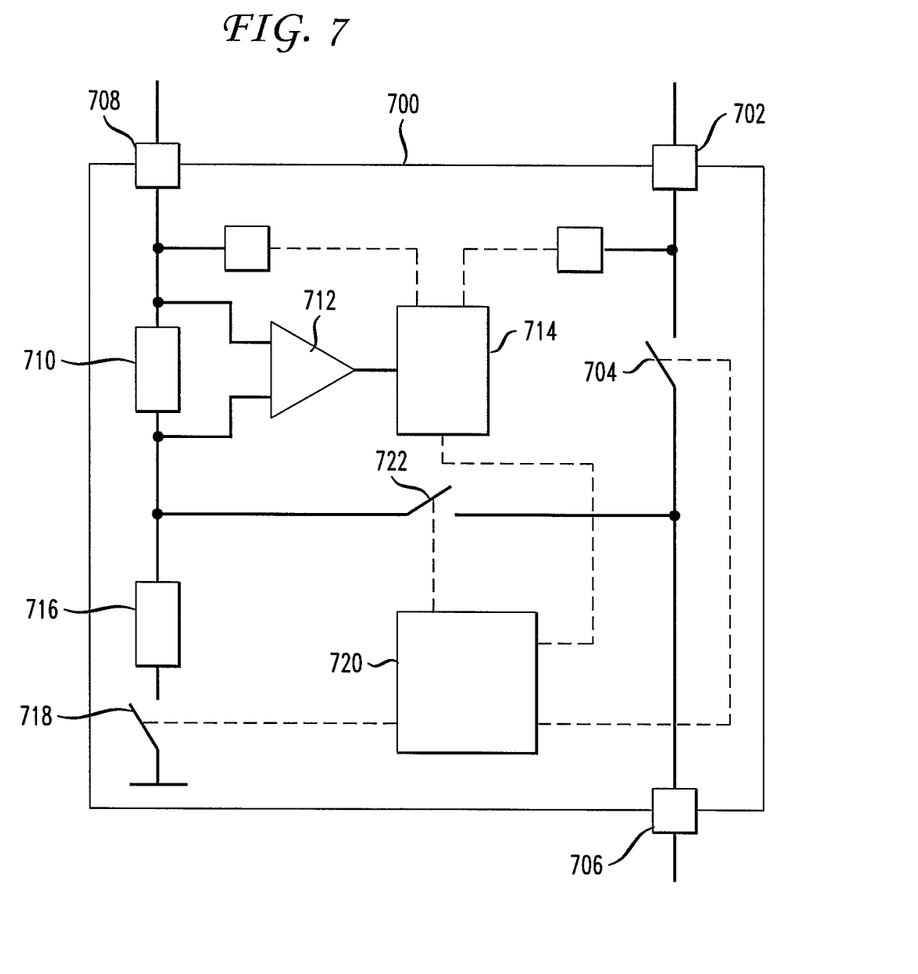
FIG. 7 depicts an exemplary channel 700 according to an embodiment of the present invention.

FIG. 7 depicts an exemplary channel (e.g., circuit) 700 according to an embodiment of the present invention. Channel 700 may be similar to channels 502a-n and 604a-n. That is, a circuit with the configuration of channel 700 may be used as or in conjunction with one or more of channels 502a-n and 604a-n. Similarly, though described below as an electrical circuit, channel 700 may be implemented over a number of electrical and/or electromechanical devices. Thus, the generic term "switching circuit" applies equally to the channel 700 as well as any other device or combination of logic and/or devices used to perform the functions of channel 700. Additionally, any appropriate combination of electrical and/or electronic elements and/or components such as resistors, inductors, capacitors, transmission lines, voltage sources, current sources, and switches may be used in the formation of such a switching circuit and/or channel. Still further, channel 700 may be implemented as one or more integrated circuits, printed circuit boards, or the like. One of skill in the art will recognize various implementations of the design of channel 700 as described herein and shown in FIG. 7.

Channel 700 includes an automatic controller input 702 coupled to a switch 704. When switch 704 is closed, automatic controller input 702 may have direct access to a valve output 706. That is, current and/or other signals may pass from an automatic controller (e.g., automatic controller 404 of FIG. 4) through automatic controller input 702 across closed switch 704 to a valve (e.g., valve 410 of FIG. 4) via valve output 706.

Channel 700 also includes machine controller input 708 coupled to a current sensor 710. In at least one embodiment, current sensor 710 may be resistor. In the same or alternative embodiments, current sensor 710 may sense current from a machine controller (e.g., machine controller 402 of FIG. 4) through machine controller input 708. Current sensor 710 may send a signal in response to a sensed current to an operational amplifier 712, which may amplify the signal and forward it to a signal conditioner 714.

Current sensor 710 is coupled to a dummy resistor 716, which is in turn coupled to a switch 718. When switch 718 is closed, dummy resistor 716 provides a dummy load to the input from machine controller input 708. This provides a path for current when switch 722 is open and switch 704 is closed (e.g., when current is flowing from automatic controller input 702 to valve output 706). Driver 720 may be coupled to and/or receive signals from signal conditioner 714. In some embodiments, driver 720 may be implemented as a component of signal conditioner 714. In the same or alternative embodiments, driver 720 may be coupled directly to and/or receive signals from current sensor 710 and/or any other appropriate intermediary device between current sensor 710 and driver 720. Driver 720 may be further coupled to and may be adapted to communicate with (e.g., pass switching signals to, etc.) switches 704, 722, and/or 718.

In practical application, an exemplary operation of channel 700 may be described as follows. Switch 704 may be initially ON (e.g., closed), allowing an automatic controller to control a valve via a path directly from automatic controller input 702 through switch 704 to valve output 706. In this initial state, switch 722 is OFF (e.g., open), preventing any leakage or trickle current from passing from machine controller input 708 to valve output 706. Switch 718 may be ON (e.g., closed), allowing dummy resistor 716 to provide a dummy load and current path to the input from machine controller input 708 as described above.

When a machine controller (e.g., machine controller 404, etc.) attempts to drive the valve, increased current will pass through machine controller input 708, current sensor 710, operational amplifier 712, and signal conditioner 714. In this way, the increased current will be detected and signal conditioner sends a signal to driver 720 to reverse the switches. That is, driver sends switching signals to open switch 704, open switch 718 and close switch 722.

If the current from the machine controller input 708 passing through current sensor 710 drops below a predetermined (e.g., user programmed, etc.) threshold, signal conditioner 714 and driver 720 again work in conjunction to reverse the switches 704, 718, and 720.

Figure 8:
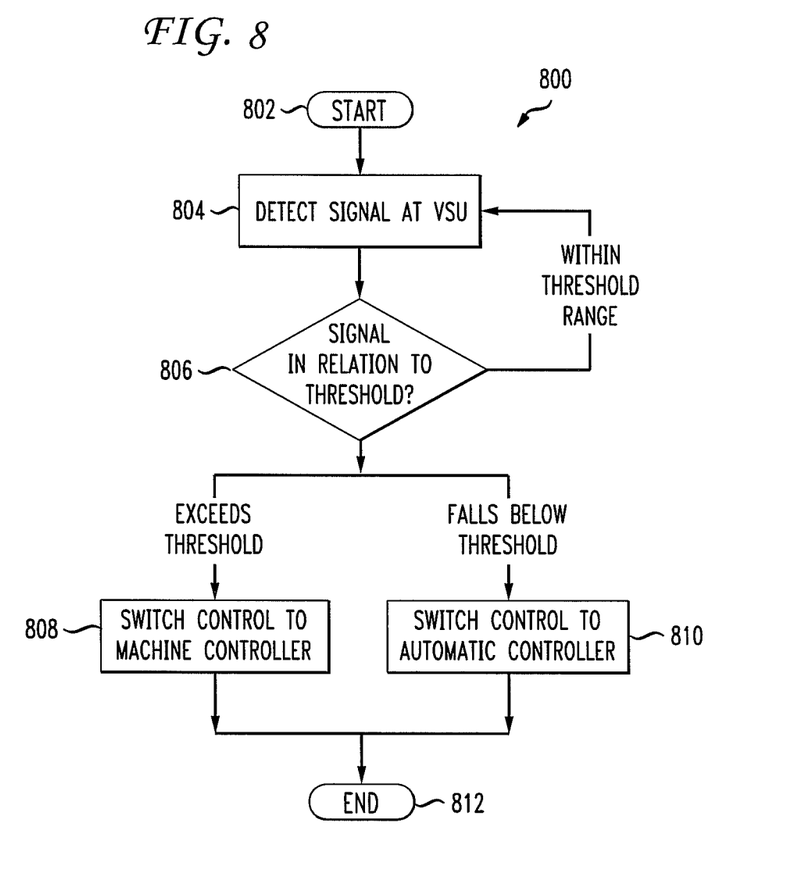
FIG. 8 is a flowchart of a method of controlling a valve according to an embodiment of the present invention.

FIG. 8 is a flowchart of a method 800 of controlling a valve. The valve controlled may be valve 410 of valve control system 400 in FIG. 4. For simplicity, method 800 is discussed with respect to valve control system 400, valve switch unit 600, and channel 700 generally. The specific exemplary embodiments of valve switch unit 500 and valve switch unit 600 as well as the channel 700 are representative of structures that may be used to carry out various functions of method 800, but the present invention is not restricted to these examples. The method begins at step 802.

Generally, a machine employing valve control system 400 may be controlled by automatic controller 406 during normal operation. That is, valve switch unit 402 may be switched to allow control signals (e.g., current) to flow from automatic controller 406 to valve 410. In an embodiment employing channel 700, switch 704 may be closed to allow current to flow from automatic controller input 702 to valve output 706 and switch 722 may be open to prevent signals from flowing from machine controller input 708 to valve output 706.

In step 804, a signal is detected at valve switch unit 402. In at least on embodiment, the signal is a current from machine controller 404. Current may be detected by, for example, current sensors 606a-n in valve switch unit 600 or through current sensor 710 in channel 700.

In step 806, a determination is made as to whether the detected signal exceeds a predetermined threshold, falls below a predetermined threshold, or remains in a predetermined threshold range (e.g., between an upper and a lower threshold). If the detected signal does not exceed the predetermined threshold (e.g., a predetermined current) or fall below a predetermined threshold, the method returns control to step 804 to continue detecting signals and the automatic controller 406 will drive the valve 410. If the signal detected exceeds the predetermined threshold, a corresponding signal is sent and the method proceeds to step 808. For example, if a current received at machine controller input 708 and detected at current sensor 710 exceeds a predetermined current level, a corresponding signal is sent throughout channel 700. If the signal falls below the predetermined threshold, a corresponding signal is sent and the method proceeds to step 810, as will be discussed in further detail below. For example, if a current received at machine controller input 708 and detected at current sensor 710 falls below a predetermined current level, a corresponding signal is sent throughout channel 700.

In response to the signal indicative of exceeding a threshold in step 806, control is switched in step 808. Control may be switched by valve switch unit 402 from automatic controller 406 to machine controller 404. In an embodiment using channel 700, upon detection of a current exceeding the predetermined threshold, switch 704 may be opened, preventing signal flow from automatic controller input 702 to valve output 706. As simultaneously as practicable, switch 722 may be closed to allow signals (e.g., current) to flow from machine controller input 708 to valve output 706. Thus, control of valve 410 may be switched from automatic controller 406 to machine controller 404. Of course, other circuits and/or methods may be used in switching control of valve 410 from automatic controller 406 to machine controller 404.

In response to the signal indicative of falling below a threshold in step 806, control of valve 410 is switched in step 810. Control may be switched by valve switch unit 402 from machine controller 404 to automatic controller 406. In an embodiment using channel 700, upon detection of a current falling below the predetermined threshold, switch 704 may be closed, allowing signal flow from automatic controller input 702 to valve output 706. As simultaneously as practicable, switch 722 may be opened to prevent signals (e.g., current) from flowing from machine controller input 708 to valve output 706. Thus, control of valve 410 may be switched from machine controller 404 to automatic controller 406. Of course, other circuits and/or methods may be used in switching control of valve 410 from machine controller 404 to automatic controller 406.

It may be understood that the method steps of method 800 may be performed in other orders. Method 800 is discussed herein as switching control of valve 410 from automatic controller 406 to machine controller 408 and the switching control of valve 410 from machine controller 408 to automatic controller 406. Of course, if control is already set to machine controller 404 (e.g., control signals are being passed from machine controller 404 to valve 410 by valve switch unit 402), method steps may be performed in another order. In this way, valve switch unit 402 may switch control of valve 410 from machine controller 404 to automatic controller 406 and back. The method 800 ends at step 812.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention.

Those skilled in the art could implement various other feature combinations without departing from the scope and spirit of the invention.

The invention claimed is:

1. An apparatus for switching control of one or more valves between a machine controller and an automatic controller comprising:
   a sensor configured to detect a signal generated by the machine controller; and
   a switching circuit configured to:
     switch control of the one or more valves from the automatic controller to the machine controller if the signal from the machine controller exceeds a predetermined threshold; and
     switch control of the one or more valves from the machine controller to the automatic controller if the signal from the machine controller falls below the predetermined threshold, wherein the switching circuit comprises:
       a resistor coupled to the sensor and configured to provide a dummy load to the machine controller;
       a first switch coupled between the automatic controller and the one or more valves and configured to allow a signal to pass from the automatic controller to the one or more valves when closed;
       a second switch coupled between the sensor and the one or more valves and configured to allow a signal to pass from the machine controller to the one or more valves when closed; and
       a third switch coupled to the resistor, wherein the third switch, when closed, provides a path for a signal from the machine controller through the resistor to provide the dummy load to the machine controller, wherein:
         the first switch and the third switch are closed and the second switch is open when the detected signal does not exceed the predetermined threshold; and
         the first switch and the third switch are open and the second switch is closed when the detected signal exceeds the predetermined threshold.

2. The apparatus of claim 1 wherein the sensor is a current sensor configured to detect current.

3. The apparatus of claim 1 wherein the sensor is configured to detect current from the machine controller indicative of an input to the machine controller from a manual controller.

4. The apparatus of claim 1 wherein the machine controller and the automatic controller are coupled to the apparatus in parallel.

5. The apparatus of claim 1 wherein the sensor is incorporated into the switching circuit.

6. The apparatus of claim 1, further comprising a signal conditioner unit communicatively coupled to the sensor and to the first switch, the second switch, and the third switch.

7. The apparatus of claim 6, wherein the signal conditioner unit simultaneously controls the first switch, the second switch, and the third switch via a driver unit.

8. A method of controlling one or more valves with a machine controller and an automatic controller comprising:
   detecting a signal from the machine controller at a valve switch unit, the valve switch unit comprising:
     a resistor coupled to a sensor and configured to provide a dummy load to the machine controller;
     a first switch coupled between the automatic controller and the one or more valves and configured to allow a signal to pass from the automatic controller to the one or more valves when closed;
     a second switch coupled between the sensor and the one or more valves and configured to allow a signal to pass from the machine controller to the one or more valves when closed; and
     a third switch coupled to the resistor, wherein the third switch, when closed, provides a path for a signal from the machine controller through the resistor;
   determining at the valve switch unit if the detected signal exceeds a predetermined threshold;
   opening the first switch and the third switch and closing the second switch, if the detected signal exceeds the predetermined threshold, to switch control of the one or more valves from the automatic controller to the machine controller;
   determining at the valve switch unit if the detected signal falls below the predetermined threshold; and
   opening the second switch and closing the first switch and the third switch if the detected signal falls below the predetermined threshold, to switch control of the one or more valves from the automatic controller to the machine controller.

9. The method of claim 8 wherein the detected signal is a detected current.

10. The method of claim 8 further comprising:
   receiving at the valve switch unit a current indicative of a control signal received at the machine controller from a manual controller.

* * * * *